Nov. 13, 1962 T. A. BARRENTINE 3,063,225
ROTARY CUTTER

Filed June 7, 1960 3 Sheets-Sheet 1

INVENTOR.
Thomas A. Barrentine
BY
Victor J. Evans & Co.
ATTORNEYS.

Nov. 13, 1962     T. A. BARRENTINE     3,063,225
ROTARY CUTTER

Filed June 7, 1960                         3 Sheets-Sheet 2

INVENTOR.
Thomas A. Barrentine
BY
Victor J. Evans & Co.
ATTORNEYS.

Nov. 13, 1962 T. A. BARRENTINE 3,063,225
ROTARY CUTTER
Filed June 7, 1960 3 Sheets-Sheet 3

INVENTOR.
Thomas A. Barrentine
BY
Victor J. Evans & Co
ATTORNEYS.

ated Nov. 13, 1962

3,063,225
ROTARY CUTTER
Thomas A. Barrentine, Greenwood, Miss., assignor to Barrentine Manufacturing Company, Greenwood, Miss., a corporation of Mississippi
Filed June 7, 1960, Ser. No. 34,585
2 Claims. (Cl. 56—25.4)

This invention relates to a mower, and more particularly to a mower for use as an attachment to a tractor.

The object of the invention is to provide a rotary cutter or mower which is adapted to be used for cutting weeds, grass, or the like which are growing or arranged on horizontal surfaces, as well as on sloping or slanting surfaces, and wherein according to the present invention the mower can be tilted or arranged at different angles or positions in order to permit the desired cutting action to be accomplished.

Another object of the invention is to provide a tractor side mount rotary mower which includes a unique and novel and safe drive that is constructed or arranged so as to eliminate the necessity of having slip clutches and shear pins, and wherein the drive includes a belt which is self locked and which can not work off, and wherein there is provided a spring loaded idler to maintain tension on the belt at all times.

Another object of the invention is to provide a side mount rotary mower which is for use with a tractor wherein the mower will permit sloping and slanting and flat cutting as well as up or down positioning of the mower so that for example the mower can be effectively and efficiently used on highway shoulders, irrigation ditch banks, levees, over ditches, as well as over sides of steep banks, and wherein a wide radius can be covered or cut so that the present invention will make it possible to cut areas or surfaces which could not be cut with a regular tractor mounted mower.

Another object of the invention is to provide a side mount rotary mower which utilizes a hydraulic control and wherein safety shields or guards are provided for the moving parts, the tractor side mount rotary mower of the present invention permitting flat cutting as well as suspension and up or down sloping so that for example highway shoulders, irrigation ditches, banks, levees, over ditches, and sides of steep banks can be readily mowed or cut.

A further object of the invention is to provide a rotary cutter which is extremely simple and inexpensive to manufacture.

Other objects and advantages will be apparent during the course of the following description.

In the accompanying drawings, forming a part of this application, and in which like numerals are used to designate like parts throughout the same:

FIGURE 10 is a view similar to FIGURES 8 and 9 but showing the mower tilted upward to a vertical position as for example when the mower is being moved over a highway or the like.

Figure 1:
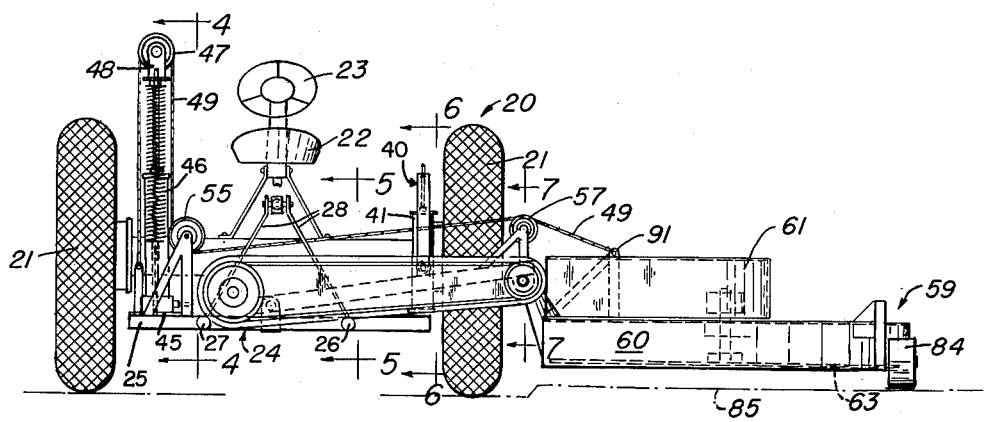
FIGURE 1 is a fragmentary rear end elevational view illustrating the tractor side mount rotary mower of the present invention and showing the mower in a horizontal position.

Referring in detail to the drawings, the numeral 20 indicates a portion of a conventional tractor which includes the usual rear wheels 21 as well as a seat 22 and a steering wheel 23, and according to the present invention there is provided an implement which includes a frame 24 that is arranged rearwardly of the tractor 20, and the frame 24 embodies a pair of spaced parallel horizontally disposed beams 25. Cross pieces 26 and 27 extend between the beams 25 and are secured thereto in any suitable manner, as for example by welding 90. Bars 28 have their lower ends connected to the cross pieces 26 and 27, and hitch elements 29, 30, and 31 are adjustably secured to the tractor and serve to connect the tractor to the frame 24 and to the upper ends of the bars 28.

There is further provided a pair of spaced parallel arms 33 which each have an end pivotally or hingedly connected to a beam 25 as at 32. Extensions 34 are adjustably or telescopically connected to the arms 33 and a cross piece 36 serves to connect the extensions 34 together. A screw member 35 is provided for adjusting the extensions 34 in or out of the arms 33, and the screw member 35 is interposed between cross pieces 26 and 36.

Figure 6:
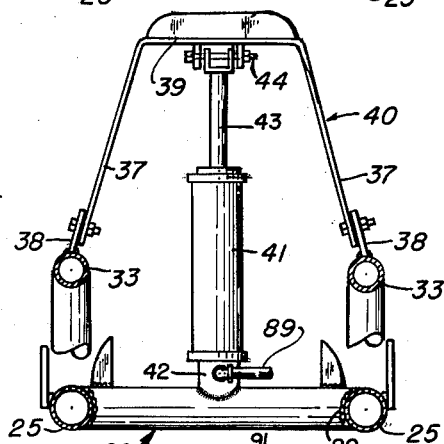
FIGURE 6 is an enlarged sectional view taken on the line 6—6 of FIGURE 2.

As shown in FIGURE 6 for example, the numeral 40 indicates a yoke which includes a pair of spaced apart legs 37 which have their lower ends connected as at 38 to the arms 33, and the yoke 40 further includes a horizontally disposed top section 39.

A hydraulic cylinder 41 is arranged so that its lower end is fixedly secured to or supported as at 42 to the frame 24, and the portion 42 may be welded in place as at 91, and a vertically movable rod 43 projects upwardly from the cylinder 41, the rod 43 being connected as at 44 to the top section 39 of the yoke 40.

Figure 4:
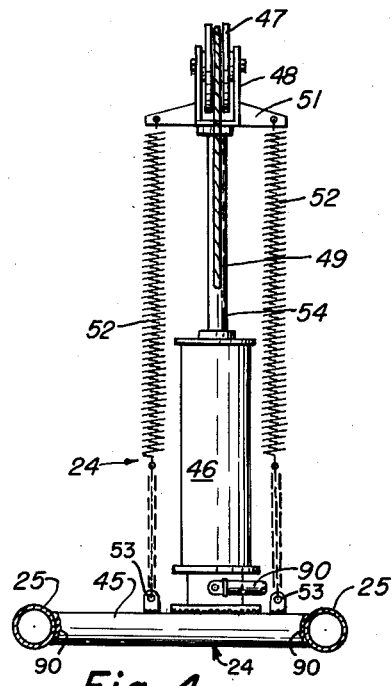
FIGURE 4 is an enlarged sectional view taken on the line 4—4 of FIGURE 1.
Figure 5:
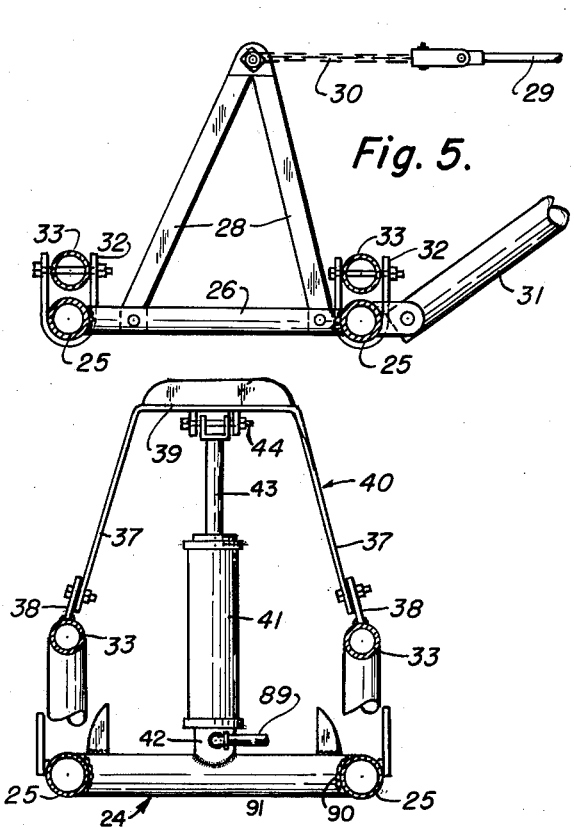
FIGURE 5 is an enlarged sectional view taken on the line 5—5 of FIGURE 2.

Extending between end portions of the beams 25 is a plate 45 which serves to support a hydraulic cylinder 46, and a vertically movable rod 54 is actuated by the cylinder 46. A pulley 47 is connected to the upper end of the rod 54 through the medium of a bracket 48, and a cable 49 is trained over the pulley 47. Opposed lugs 51 are connected to the bracket 48, FIGURE 4, and return springs 52 have their upper ends connected to the lugs 51, while the lower ends of the springs 52 are anchored as at 53 to the frame 24.

The numeral 55 indicates a pulley which is supported by braces 56 which are suitably affixed to the frame 24, FIGURE 3, and the cable 49 is trained below the pulley 55. There is also provided a pulley 57 which is supported by braces 58, and the braces 58 are connected to the crosspieces 36, and the cable 49 is trained over the pulley 57.

Figure 8:
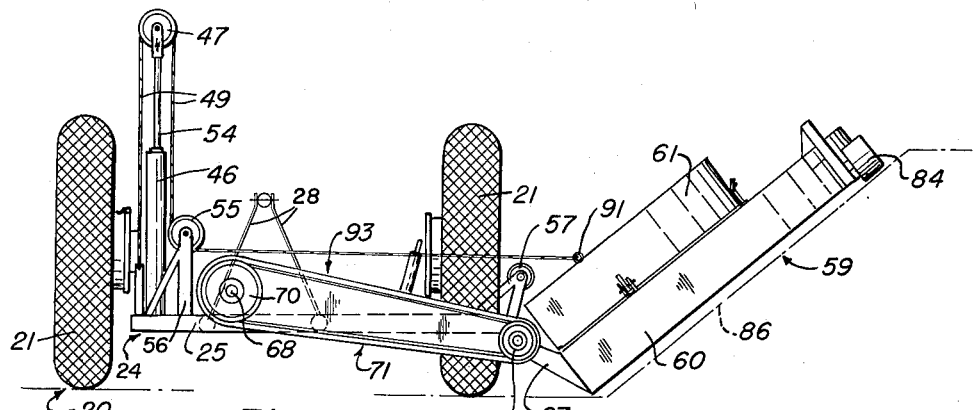
FIGURE 8 is a fragmentary rear elevational view showing the mower tilted up at an angle.

The numeral 59 indicates an adjustable mower which includes a body member 65 that has a depending safety flange or shield portion 60, and there is provided on the mower an upstanding guard or shield 61, FIGURE 8. The numeral 62 indicates a shaft for the mower 59, and the shaft 62 has its lower end connected to a rotary cutting blade or knife 63, and a pulley member or wheel 64 is suitably affixed to the upper end of the shaft 62, for a purpose to be later described.

Figure 9:
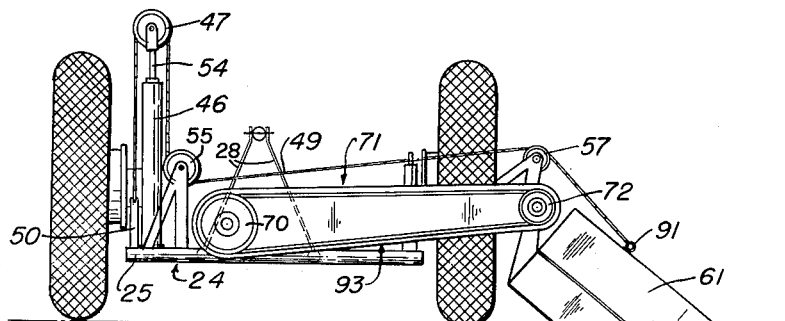
FIGURE 9 is a view similar to FIGURE 8 but showing the mower tilted downwardly.
Figure 10:
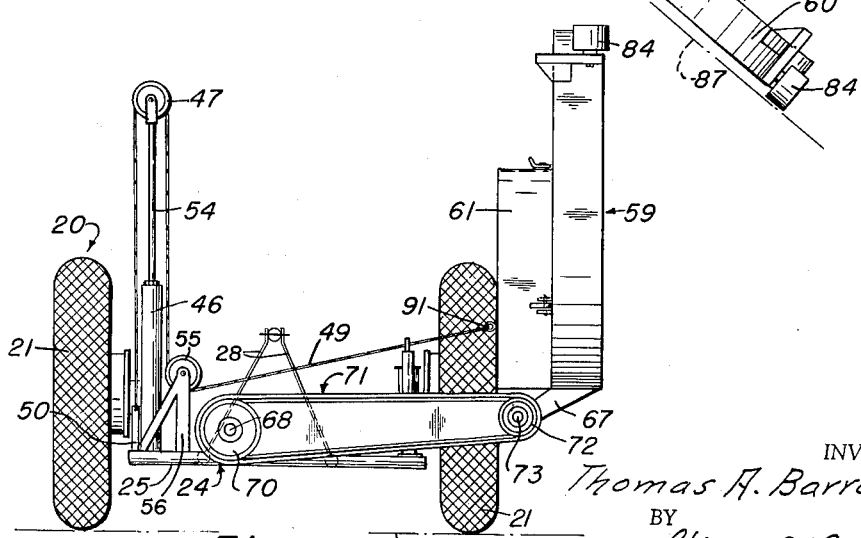

The mower 65 is hingedly or pivotally supported as at 66 and 67 so that for example the mower 59 can be arranged in either the position shown in FIGURE 8 or FIGURE 9 or FIGURE 10.

The numeral 68 indicates a shaft which is coupled or connected to the power take-off shaft 74 of the tractor 20 as at 69, and a pulley 70 is suitably mounted on the shaft 68. The numeral 71 indicates a plurality of endless belts which are trained over the pulley 70, and the belts 71 are also trained over the pulley 72 on a shaft 73.

A pulley member or wheel 75 is mounted on the shaft 73, and the numeral 76 indicates an idler which is journaled on the mower 59 as for example by means of a pin or shaft 77, and the endless belt 78 is engaged by the idler 76. The numeral 83 indicates a pressure roller or idler which is urged against the belt 78 by means of springs 82 which are mounted on rods or bolts 81, and the idler 83 is supported on a shaft 79 which extends between a pair of pivotally mounted support members 80, so that in effect the rods 81 are connected to the supports 80, FIGURE 11.

From the foregoing, it is apparent that there has been provided a side mount rotary mower which is especially suitable for use in trimming or cutting weeds, grass, or the like which are growing along various surfaces whether the surfaces are horizontal or at an angle. The mower is provided with a wheel or roller 84 which is adapted to engage the ground when the mower 59 is in a generally horizontal position, as for example in FIGURE 1 the wheel 84 is shown engaging a slightly raised shoulder 85 which has grass or weeds thereon and wherein the growing material is being cut by the rotary knife or blade 63. As shown in FIGURE 8 the mower 59 can be tilted upwardly at an angle as for example when mowing along an upwardly inclined bank as indicated by the numeral 86. Or, as shown in FIGURE 9, the mower 59 can be tilted downwardly in order to mow along the edge of a ditch 87. In FIGURE 10 the mower 59 is shown in the vertically disposed position as for example when the tractor is moving along a highway as indicated by the numeral 88 so that with the parts in the position of FIGURE 10 a minimum amount of space is required for travel along the highway or the like.

Figure 2:
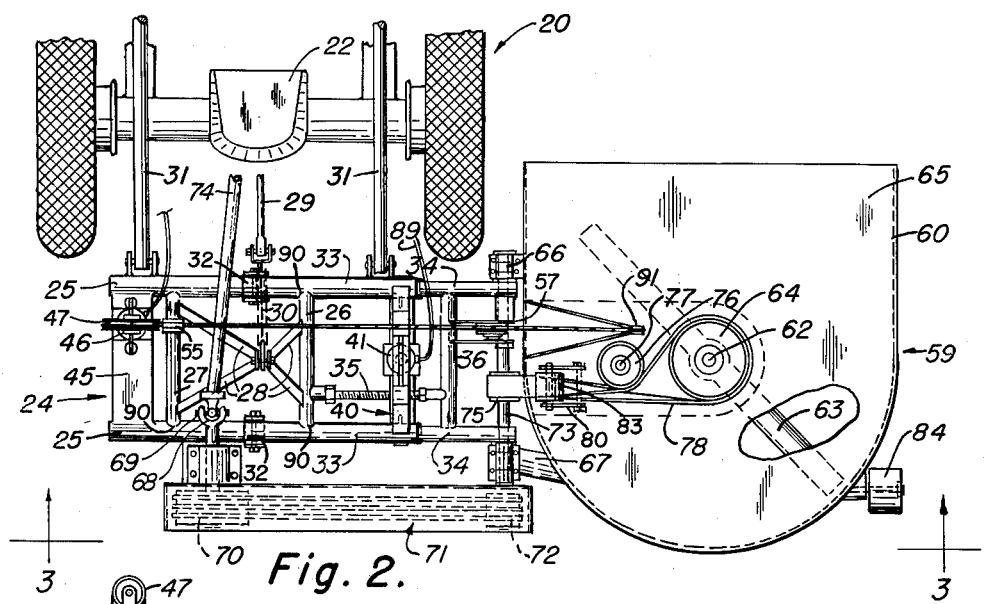
FIGURE 2 is a fragmentary plan view, with the parts in the position of FIGURE 1.
Figure 3:
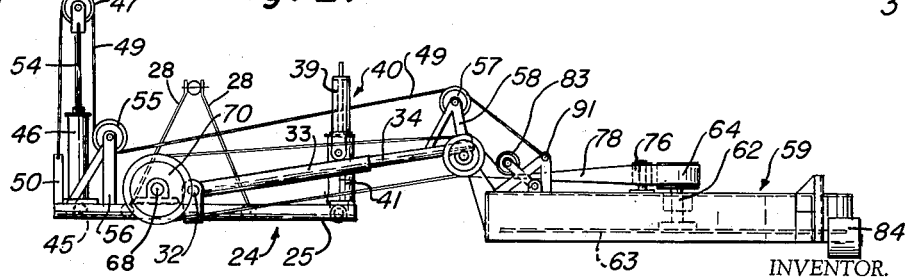
FIGURE 3 is a sectional view taken on the line 3—3 of FIGURE 2.

In use, it will be seen that with the parts arranged as shown in the drawings, the tractor 20 moves along an area which is to be mowed, and with the parts arranged as shown in FIGURE 1 or FIGURES 2 and 3 for example, it will be seen that the usual lift elements on the tractor can be actuated in order to raise or lower the entire frame 24 so that the frame 24 can be positioned at the desired height or elevation as desired. Then, by actuating the power take-off 74 of the tractor 20, the blade 63 can be caused to rotate so that grass or the like in the path of the mower 59 will be effectively cut or severed. This driving or operative connection between the power take-off 74 and the blade 63 consists of the following elements. The shaft 68 which is coupled as at 69 to the rear end of the power take-off 74 and the pulley 70 on the shaft 68. The pulley 70 has the plurality of belts 71 trained thereover, and the belts 71 are also trained over the pulley 72 on the shaft 73 so that it will be seen that as the shaft 73 rotates, it will turn the pulley 75, and since the pulley 75 has a portion of the wide belt 78 arranged in engagement therewith, it will be seen that this will cause travel or movement of the belt 78. Since a portion of the belt 78 is arranged in engagement with the pulley 64 on the shaft 62 of the blade or knife 63, it will be seen that this will cause rotation of the knife 63 in the desired manner in order to cut the grass, weeds, or the like. The idler 83 is urged into engagement with the belt 78 by means of the spring 82 so as to insure that the belt 78 will be maintained under the proper tension and the belt 78 in conjunction with the rollers or pulleys 75, 83, 76 and 64 serve to insure that the shaft 62 will be rotated regardless of the position of the mower 59 so that for example if the mower 59 is in a horizontal or vertical or upwardly tilted or downwardly tilted position, the operative connection between the power take-off and the knife 63 will be continued so that rotation of the knife 63 will continue regardless of the position of the mower. This is important since the power 59 can efficiently function whether it is in a horizontal position as shown in FIGURE 1 for use in mowing along a shoulder such as the shoulder 85, or whether it is in an upwardly tilted position as shown in FIGURE 8 so that a bank 86 can be mowed, and in addition a ditch such as the ditch 87 can be mowed with the parts in the position of FIGURE 9. In addition other intermediate positions are possible and at all times the driving connection between the power take-off and the knife will be maintained.

There is further provided a novel means for adjusting the position of the parts so that an effective control means is provided for the present invention. Thus, by moving the hitch elements 31 and 29 from the usual mechanism on the tractor, the entire frame 24 can be raised or lowered as desired, and this provides one adjustment. In addition, by actuating the hydraulic cylinder 41 which may be connected to a suitable source of hydraulic fluid under pressure by means of a conduit 89, it will be seen that the rod 43 can be raised and this upward movement of the rod 43 will raise the yoke 40, FIGURE 6, and since the yoke 40 has its lower end portion connected as at 38 to the tiltable arm 33, it will be seen that the arms 33 can be pivoted about an axis extending through the pivot mountings 32 so that by actuating the cylinder 41 the entire mower unit 59 can be raised or lowered and this provides a means for permitting grass or the like to be cut at a desired elevation. The mower 59 is hingedly connected as at 66 and 57 to the shaft 73 which is supported by the extensions 34 so that the mower 59 is free to tilt or pivot independently of the arms and extensions or frame 24. The wheel 84 is adapted to engage the ground, as for example as shown in FIGURE 9 or as shown in FIGURE 1 so as to provide additional support for the outer end portion of the mower.

A further adjustment is possible due to the provision of the cylinder 46 and its associated parts. The cylinder 46 is adapted to be connected to a suitable source of hydraulic fluid under pressure by means of a conduit such as the conduit 90, FIGURE 4, and it is to be understood that suitable control valves, pumps and the like may be provided in a suitable location such as on the tractor 20 for applying the hydraulic fluid under the necessary pressure for a cylinder such as the cylinders 46 and 41. By supplying hydraulic fluid to the cylinder 46, the rod 54 will be raised and this will lift the pulley 47 which is suitably mounted on the upper end of the rod 54. As the pulley 47 moves upwardly, it will apply tension or pressure to the cable 49 since the cable 49 is trained over the pulley 47. Due to the fact that one end of the cable 49 is anchored as at 50 to the frame 24, and since the cable 49 is trained under the pulley 55 and over the pulley 57, and since the other end of the cable 49 is anchored as at 91 to the mower 59, it will be seen that as the cylinder 46 is actuated to move the pulley 47 upwardly, the mower 59 will be tilted so that for example the mower 59 can be moved from the position shown in FIGURE 1 to the position such as that shown in FIGURE 8 or to the position shown in FIGURE 10. By releasing the pressure of the hydraulic fluid in the cylinder 46, the springs 52 will function as return springs so as to return the pulley 47 and its associated parts to a lowered position and this construction permits the mower 59 to be arranged at the desired angle as for example it can be permitted to tilt downwardly as shown in FIGURE 9 when desired.

The screw member 35 provides a means for adjusting the position of the extensions 34 in the arms 33 so that by rotating the screw member or rod 35, the extensions 34 may be moved in or out of the arms 33 to the desired location and this provides a means of adjusting tension on the belt 71 and also provides a means for locating certain of the parts such as the mower 59 and at the desired location with respect to the frame.

The parts can be made of any suitable material and in different shapes or sizes.

The present invention is ruggedly constructed and provides a side mounted mower or cutter which is capable of mowing a wide area such as a sixty inch area with each pass of the mower so that large surfaces can be readily and conveniently mowed or cut.

The tractor side mount rotary mower of the present invention can be used for different purposes as for example it can be used on highway shoulders such as on the shoulder 85 shown in FIGURE 1, or it can be used for cutting along irrigation ditch banks such as the bank 87 in FIGURE 9, or it can be used along levees or over ditches, or it can be used along the sides of steep banks such as the bank 86 in FIGURE 8. With the present invention flat cutting is possible as well as suspension and up or down sloping of the mower, are readily available. The mower can be arranged at an upward or downward tilted angle and wherein a radius of 160° can be covered so that the present invention can be used in conditions or areas which are not possible with regular tractor mounted mowers.

Figure 11:
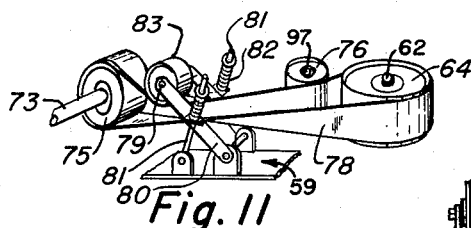
FIGURE 11 is a fragmentary view illustrating certain constructional details of the drive mechanism.
Figure 7:
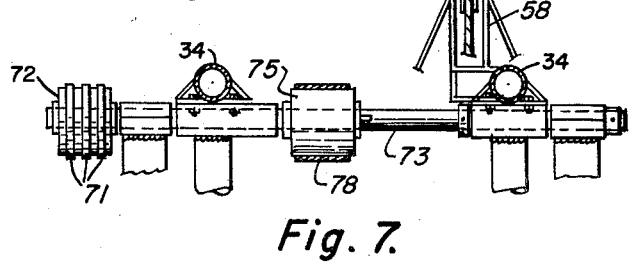
FIGURE 7 is an enlarged sectional view taken on the line 7—7 of FIGURE 1.

Some of the important aspects of the present invention are as follows. There is provided an endless flat cord belt drive including the belt mechanism 38 and its associated parts as shown in FIGURE 11 which provides a safe and efficient drive eliminating the necessity of slip clutches and shear pins and this drive is arranged so that the belt 78 is self locked and cannot work off and it has the spring loaded idler 83 to retain tension on the belt at all times, and no gears are used.

The mower is hydraulically controlled and can be instantly changed to any position by the operator while seated on the tractor. The main frame is adapted to be made of a suitable material such as electrically welded pipe which is advantageous as it eliminates weight but not ruggedness of construction. The moving parts are shielded for protection of the operator or the like, and wherein the shield such as the shield 61 are provided for protection against the traveling belt 78 and its associated parts, and in addition a shield 93 is adapted to be provided for enclosing the belts 71 so as to provide protection against the traveling belts 71.

Minor changes in shape, size and rearrangement coming within the field of invention claimed may be resorted to in actual practice if desired.

What is claimed is:

1. In a device of the character described, a frame including a pair of beams, crosspieces extending between said beams, a pair of spaced parallel arms pivotally connected to said beams, extensions adjustably connected to said arms, a screw member for adjusting said extensions in said arms, a yoke including a pair of spaced apart legs having their lower ends affixed to said arms, said yoke further including a top section extending between the upper ends of said legs, a hydraulic cylinder including a movable rod having its upper end connected to said top section, a plate extending between end portions of the beams, a hydraulic cylinder on said plate having a vertically movable rod, a first pulley mounted on the upper end of said rod, a cable trained over said pulley and having one end anchored to said frame, spring members for normally urging the pulley to a downward position, a second pulley supported by said frame and having said cable trained thereunder, a third pulley supported by said extensions and having said cable trained thereover, a mower including a tiltable body member connected to an end of said cable, said mower including a rotary cutting blade, and means for rotating said blade.

2. The structure as defined in claim 1 and wherein said last named means comprising a shaft adapted to be connected to a power source, a first pulley wheel on said shaft, a second pulley wheel spaced from said first pulley wheel, a plurality of endless belts trained over said first and second pulley wheels, a shaft connected to the second pulley wheel, a shaft operatively connected to said rotary cutting blade, pulley members on said last named shafts, an endless belt engaging said last named pulley members, and a spring loaded idler engaging said last named belt.

References Cited in the file of this patent

UNITED STATES PATENTS

| | | |
|---|---|---|
| 2,328,838 | Oberlink | Sept. 7, 1943 |
| 2,422,044 | Ronning et al. | June 10, 1947 |
| 2,588,004 | Holmes | Mar. 4, 1952 |
| 2,690,040 | Miller et al. | Sept. 28, 1954 |
| 2,786,320 | Larson | Mar. 26, 1957 |
| 2,928,223 | Danuser | Mar. 15, 1960 |